United States Patent
Baqai et al.

(10) Patent No.: US 9,626,745 B2
(45) Date of Patent: Apr. 18, 2017

(54) TEMPORAL MULTI-BAND NOISE REDUCTION

(71) Applicant: Apple Inc., Cupertino, CA (US)

(72) Inventors: Farhan A. Baqai, Fremont, CA (US); Fabio Riccardi, Palo Alto, CA (US); Russell A. Pflughaupt, San Jose, CA (US); Claus Molgaard, Los Gatos, CA (US); Gijesh Varghese, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/872,104

(22) Filed: Sep. 30, 2015

(65) Prior Publication Data

US 2017/0069060 A1    Mar. 9, 2017

Related U.S. Application Data

(60) Provisional application No. 62/214,534, filed on Sep. 4, 2015, provisional application No. 62/214,514, filed on Sep. 4, 2015.

(51) Int. Cl.
*G06K 9/40* (2006.01)
*G06T 5/00* (2006.01)
(Continued)

(52) U.S. Cl.
CPC ............... *G06T 5/002* (2013.01); *G06K 9/40* (2013.01); *G06T 5/20* (2013.01); *G06T 5/50* (2013.01);
(Continued)

(58) Field of Classification Search
CPC ........... G06T 2207/20016; G06T 5/002; G06T 2207/10024; G06T 5/10; H04N 5/217; H04N 9/045; H04N 9/77
(Continued)

(56) References Cited

U.S. PATENT DOCUMENTS 5,130,798 A * 7/1992 Christopher ........... H04N 7/012
                                                                348/620
6,018,596 A * 1/2000 Wilkinson ............. H04N 5/142
                                                                348/E5.064
(Continued)

OTHER PUBLICATIONS

A. Buades, B. Coll, and J.-M. Morel, "A non-local algorithm for image denoising," in Proceedings of IEEE Conference on Computer Vision and Pattern Recognition, vol. 2, 2005, pp. 60-65.
(Continued)

*Primary Examiner* — Kanjibhai Patel
(74) *Attorney, Agent, or Firm* — Blank Rome LLP

(57) ABSTRACT

Systems, methods, and computer readable media to fuse digital images are described. In general, techniques are disclosed that use multi-band noise reduction techniques to represent input and reference images as pyramids. Once decomposed in this manner, images may be fused using novel low-level (noise dependent) similarity measures. In some implementations similarity measures may be based on intra-level comparisons between reference and input images. In other implementations, similarity measures may be based on inter-level comparisons. In still other implementations, mid-level semantic features such as black-level may be used to inform the similarity measure. In yet other implementations, high-level semantic features such as color or a specified type of region (e.g., moving, stationary, or having a face or other specified shape) may be used to inform the similarity measure.

25 Claims, 8 Drawing Sheets

(51) Int. Cl.
*G06T 5/50* (2006.01)
*G06T 5/20* (2006.01)
*H04N 5/217* (2011.01)

(52) U.S. Cl.
CPC .... *G06T 5/009* (2013.01); *G06T 2207/10024* (2013.01); *G06T 2207/20016* (2013.01); *G06T 2207/20182* (2013.01); *G06T 2207/20208* (2013.01); *H04N 5/217* (2013.01)

(58) Field of Classification Search
USPC .................................................. 382/260, 261
See application file for complete search history.

(56) References Cited

U.S. PATENT DOCUMENTS

| | | | |
|---|---|---|---|
| 6,526,181 B1 | 2/2003 | Smith | |
| 6,804,408 B1 | 10/2004 | Gallagher | |
| 7,426,314 B2 | 9/2008 | Kimbell | |
| 7,432,986 B2 | 10/2008 | Winger | |
| 7,437,013 B2 | 10/2008 | Anderson | |
| 7,515,160 B2 | 4/2009 | Kerofsky | |
| 7,590,303 B2 | 9/2009 | Lee | |
| 7,969,511 B2 | 6/2011 | Kim | |
| 8,108,211 B2 | 1/2012 | Baqai | |
| 8,194,160 B2 | 6/2012 | Tsuruoka | |
| 8,264,574 B2 | 9/2012 | Grosvenor | |
| 8,411,938 B2* | 4/2013 | Zhang | G06T 3/4061 348/453 |
| 8,571,347 B2 | 10/2013 | Srinivasan | |
| 8,614,746 B2 | 12/2013 | Choe | |
| 8,711,248 B2* | 4/2014 | Jandhyala | G06T 5/50 348/208.1 |
| 8,711,249 B2 | 4/2014 | Baqai | |
| 8,743,208 B2 | 6/2014 | Ovsiannikov | |
| 8,768,054 B2 | 7/2014 | Aragaki | |
| 8,989,516 B2* | 3/2015 | Albu | G06T 3/4053 382/167 |
| 9,299,130 B2* | 3/2016 | Panetta | G06T 5/002 |
| 2002/0196907 A1 | 12/2002 | Shinbata | |
| 2006/0023965 A1 | 2/2006 | Kimbell | |
| 2006/0088275 A1 | 4/2006 | Odea | |
| 2006/0274210 A1 | 12/2006 | Kim | |
| 2007/0085857 A1 | 4/2007 | Bang | |
| 2007/0146236 A1 | 6/2007 | Kerofsky | |
| 2007/0258657 A1 | 11/2007 | Kryda | |
| 2008/0199100 A1 | 8/2008 | Ishiga | |
| 2008/0240203 A1* | 10/2008 | Baqai | G01V 1/28 375/130 |
| 2009/0096882 A9 | 4/2009 | Johnson | |
| 2009/0129695 A1 | 5/2009 | Aldrich | |
| 2009/0136057 A1* | 5/2009 | Taenzer | H04R 3/005 381/74 |
| 2009/0148063 A1 | 6/2009 | Hosoda | |
| 2009/0322912 A1 | 12/2009 | Blanquart | |
| 2011/0075935 A1 | 3/2011 | Baqai | |
| 2012/0019690 A1 | 1/2012 | Stirling-Gallacher | |
| 2012/0207396 A1 | 8/2012 | Dong | |
| 2012/0301046 A1 | 11/2012 | Wallace | |
| 2012/0307110 A1 | 12/2012 | Baqai | |
| 2013/0329004 A1 | 12/2013 | Baqai | |
| 2014/0044375 A1 | 2/2014 | Xu | |

OTHER PUBLICATIONS

C. Liu, W. T. Freeman, R. Szeliski, and S. B. Kang, "Noise estimation from a single image," in Proceedings of IEEE Conference on Computer Vision and Pattern Recognition, vol. 1, 2006, pp. 901-908.
S. J. Julier, "The scaled unscented transformation," in Proceedings of American Control Conference, vol. 6, 2002, pp. 4555-4559.
X. Liu, M. Tanaka, and M. Okutomi, "Estimation of signal dependent noise parameters from a single image," in Proceedings of IEEE International Conference on Image Processing, 2013, pp. 79-82.
X. Liu, M. Tanaka, and M. Okutomi, "Noise level estimation using weak textured patches of a single noisy image," in Proceedings of IEEE International Conference on Image Processing, 2012, pp. 665-668.

* cited by examiner

TEMPORAL MULTI-BAND NOISE REDUCTION

This application claims priority to U.S. Patent Application Ser. No. 62/214,514, entitled "Advanced Multi-Band Noise Reduction," filed Sep. 4, 2015 and U.S. Patent Application Ser. No. 62/214,534, entitled "Temporal Multi-Band Noise Reduction," filed Sep. 4, 2015, both of which are incorporated herein by reference. In addition, U.S. patent application Ser. No. 14/474,100, entitled "Multi-band YCbCr Noise Modeling and Noise Reduction based on Scene Metadata," and U.S. patent application Ser. No. 14/474,103, entitled "Multi-band YCbCr Locally-Adaptive Noise Modeling and Noise Reduction based on Scene Metadata," both filed Aug. 30, 2014, and U.S. Patent Application Ser. No. 61/656,078 entitled "Method of and Apparatus for Image Enhancement," filed Jun. 6, 2012 are incorporated herein by reference.

BACKGROUND

As manufacturing capabilities have improved for image sensor devices, it has become possible to place more pixels on a fixed-size image sensor. As a consequence, pixel size has shrunk. From a signal processing perspective, more pixels imply that the scene is sampled at a higher rate providing a higher spatial resolution. Smaller pixels, however, collect less light (photons) which, in turn, leads to smaller per-pixel signal-to-noise ratios (SNRs). This means as light levels decrease, the SNR in a smaller pixel camera decreases at a faster rate than the SNR in a larger pixel camera. Thus, the extra resolution provided by a smaller pixel comes at the expense of increased noise.

There are several approaches to address the reduced signal provided by ever-smaller sensor pixel size that can result in noisy images. One approach employs image fusion. Image fusion involves acquiring multiple images. These images could come from the same sensor or multiple sensors, they could be of the same exposure or of different exposures, and they could come from different sensors with different types of lenses. Once obtained, the images are spatially aligned (registered), calibrated, transformed to a common color space (e.g., RGB, YCbCr, or Lab), and fused. Due to varying imaging conditions between the obtained images, perfect pixel-to-pixel registration is most often not possible. The problem during fusion then, is to determine if a pixel in an input image is sufficiently similar—via a similarity measure—to the corresponding pixel in a reference image. Fusion performance is directly dependent on the ability of the similarity measure to adapt to imaging conditions. If the similarity measure cannot adapt, fusion can result in severe ghosting. Similarity measures are typically pixel-based or patch-based. Pixel-based similarity measures work well when the reference pixel is reasonably close to the noise-free pixel value. As light decreases and noise becomes progressively comparable to signal, pixel-based similarity measures break down. That is, if the reference pixel is noisy, pixel-based similarity measures use the noisy pixel to decide if the corresponding pixel in an input image should be fused or not. These limitations have been addressed by patch-based distance measures. To decide if a pixel is similar, instead of a single pixel comparison, a patch centered on the pixel to be fused is compared. Typical patch sizes range from 3×3 (9 pixels), 5×5 (25 pixels), 7×7 (49 pixels), and so on. Hence patch-based similarity measures are less sensitive to noise than pixel-based similarity measures. This robustness to noise, however, comes at an increased computational cost: for a 3×3 patch, there are 9 comparisons per pixel as compared to 1 for a pixel-based similarity measure. One challenge then, is to devise methodologies that account for noise so that accurate similarity measures may be developed. With accurate similarity measures image fusion can more readily be used to mitigate a sensor's inherent low signal level.

SUMMARY

In one embodiment the disclosed concepts provide a method to perform multi-band fusion. The method includes receiving three or more images, wherein each image includes a plurality of channel types (e.g., Y, Cb, and Cr), each image has one of each type of channel; selecting one of the images as a reference image, the other images being input images; applying multi-band noise reduction to the reference image to generate a filtered pyramidal representation of each of the reference image's channels (e.g., pyramidal representation of the reference image's Y, Cb and Cr channels); applying multi-band noise reduction to each input image to generate a filtered pyramidal representation of each input image's type of channel (e.g., pyramidal representations for each input images Y, Cb and Cr channels); fusing, on a level-by-level basis, each of the reference image's filtered pyramidal representations with a corresponding filtered pyramidal representation of each input image to generate a fused image channel for each type of channel. That is, all Y channel pyramidal representations may be fused (e.g., lowest to highest layer or band), and Cb pyramidal representations may be fused, and all Cr pyramidal representations may be fused. Once individual channels are fused, the image may be stored to memory as is (e.g., in YCbCr format), or converted to another format (e.g., RGB), compressed (e.g., into a JPEG format), and stored to the memory. In one embodiment, each of the three or more images may have a different exposure. In another embodiment, at least one of the three or more images is overexposed and at least one other image is under-exposed. In yet another embodiment, fusing comprises determining a first metric indicative of a quality of fusion of a first fused image channel; and applying a second multi-band noise reduction to the first fused image channel based on the first metric. In still other embodiments, fusing may be based on a similarity metric that compares a pixel at a first level of a pyramidal representation of the reference image with a corresponding pixel at a different level of pyramidal representation of an input image. In some embodiments, the similarity metric may be based on a gradient between the reference image pixel and the input image pixel. In one embodiment, fusing may be based on a similarity measure that accounts for a black level difference (estimated or determined) between the reference image and an input image. In yet other embodiments, fusing may take into account smooth blue regions in the reference and input images. A computer executable program to implement the method may be stored in any media that is readable and executable by a computer system (e.g., prior to execution a non-transitory computer readable memory).

DETAILED DESCRIPTION

This disclosure pertains to systems, methods, and computer readable media to fuse digital images. In general, techniques are disclosed that use multi-band noise reduction techniques to represent input and reference images as pyramids. (Each pyramid's top-most level reflects an image's highest frequency components, and each pyramid's bottom-most level reflects the image's lowest frequency components.) Once decomposed in this manner, images may be fused using novel low-level (noise dependent) similarity measures. In one embodiment, similarity measures may be based on intra-level comparisons between reference and input image. In another embodiment, similarity measures may be based on inter-level comparisons. In still other embodiments, mid-level semantic features such as black-level may be used to inform the similarity measure. In yet other embodiments, high-level semantic features such as color or a specified type of region (e.g., moving, stationary, or having a face or other specified shape) may be used to inform the similarity measure.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nonetheless be a routine undertaking for those of ordinary skill in the design and implementation of a graphics processing system having the benefit of this disclosure.

Figure 1:
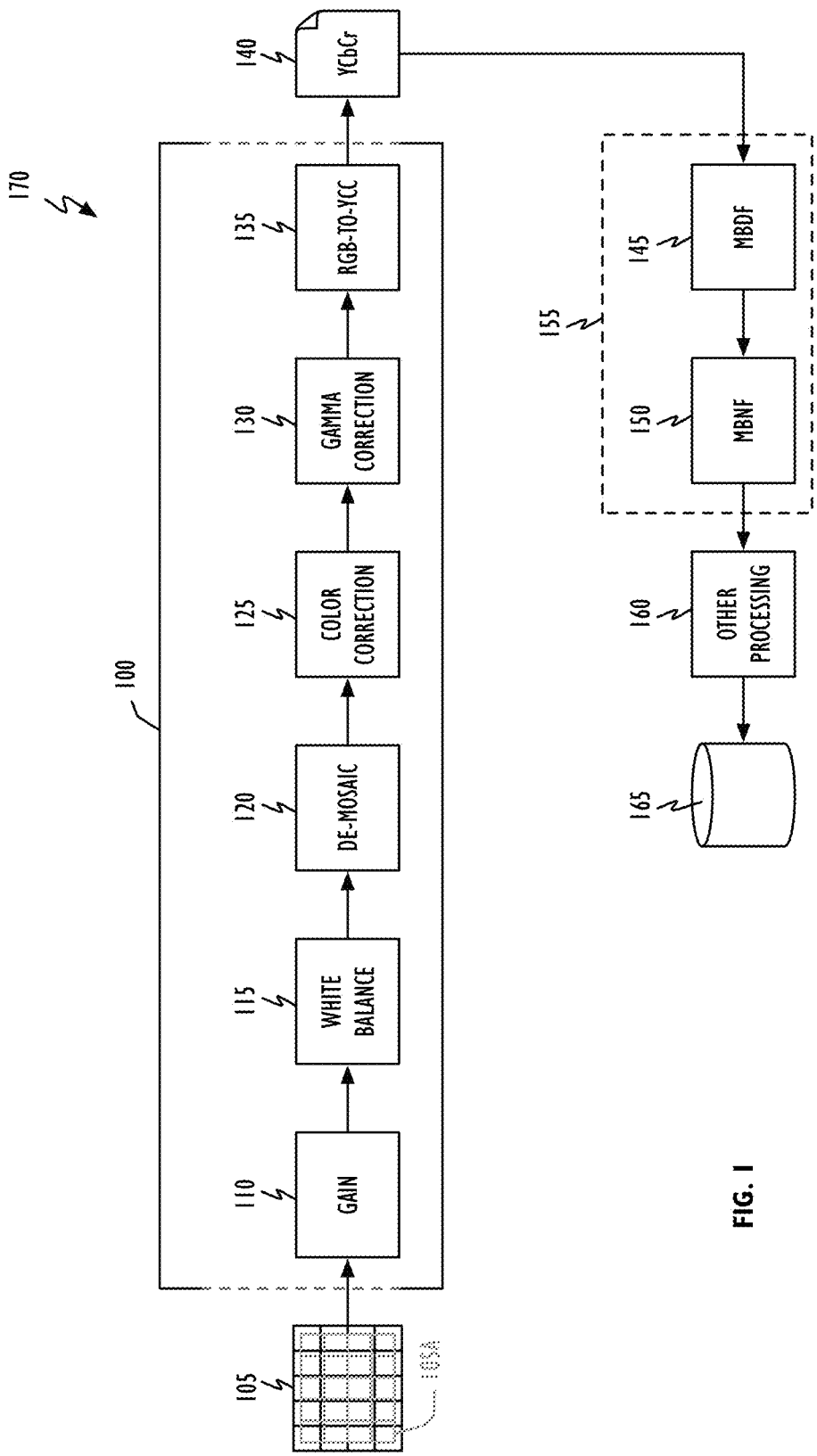
FIG. 1 shows, in block diagram form, an image capture system in accordance with one embodiment.

Referring to FIG. 1, in accordance with one embodiment image signal processor (ISP) or image pipeline 100 takes a raw image from image sensor 105, at which time the image's noise may be characterized as Gaussian, white, and uncorrelated. (The image does, however, exhibit a signal level dependence due to Bayer color filter array 105A). Representative image pipeline 100 includes gain stage 110, white balance stage 115, de-mosaic stage 120, color correction stage 125, gamma correction stage 130, and RGB-to-YCbCr color space conversion stage 135. Unlike a RAW image, the noise of luma-chroma (YCbCr) image 140 is not Gaussian, white or uncorrelated. Rather, image 140 exhibits noise that is channel, level, illuminant and frequency dependent and, further, the different channels may be correlated. Following image pipeline 100 operations, individual channels within luma-chroma image 140 may be separated into different bands by multi-band decomposition filters (MBDF) 145, where after each band may be sharpened and de-noised based on its particular noise model by multi-band noise filters (MBNF) 150. In accordance with this disclosure, the combination of MBDF 145 and subsequent application of MBNF 150 may be referred to as multi-band noise reduction (MBNR) 155. Finally, the noise-reduced and sharpened image may be converted back into the RGB color space and compressed (actions represented by block 160), and saved to storage element 165. Image pipeline 100, sensor 105, MBNR block 155, processing block 160, and storage element 165 represent one embodiment of an image capture system 170. In another embodiment, image capture system 170 does not include processing block 160 and/or storage element 165. An "image capture system" as that term is used in this disclosure is taken to be any collection of elements that can record and apply MBNR operations to a digital image. System 170 (with or without processing block 160 and/or long-term storage element 165) may be found in, for example, digital SLR cameras, digital point-and-shoot cameras, mobile telephones and personal media player devices.

Figure 2:
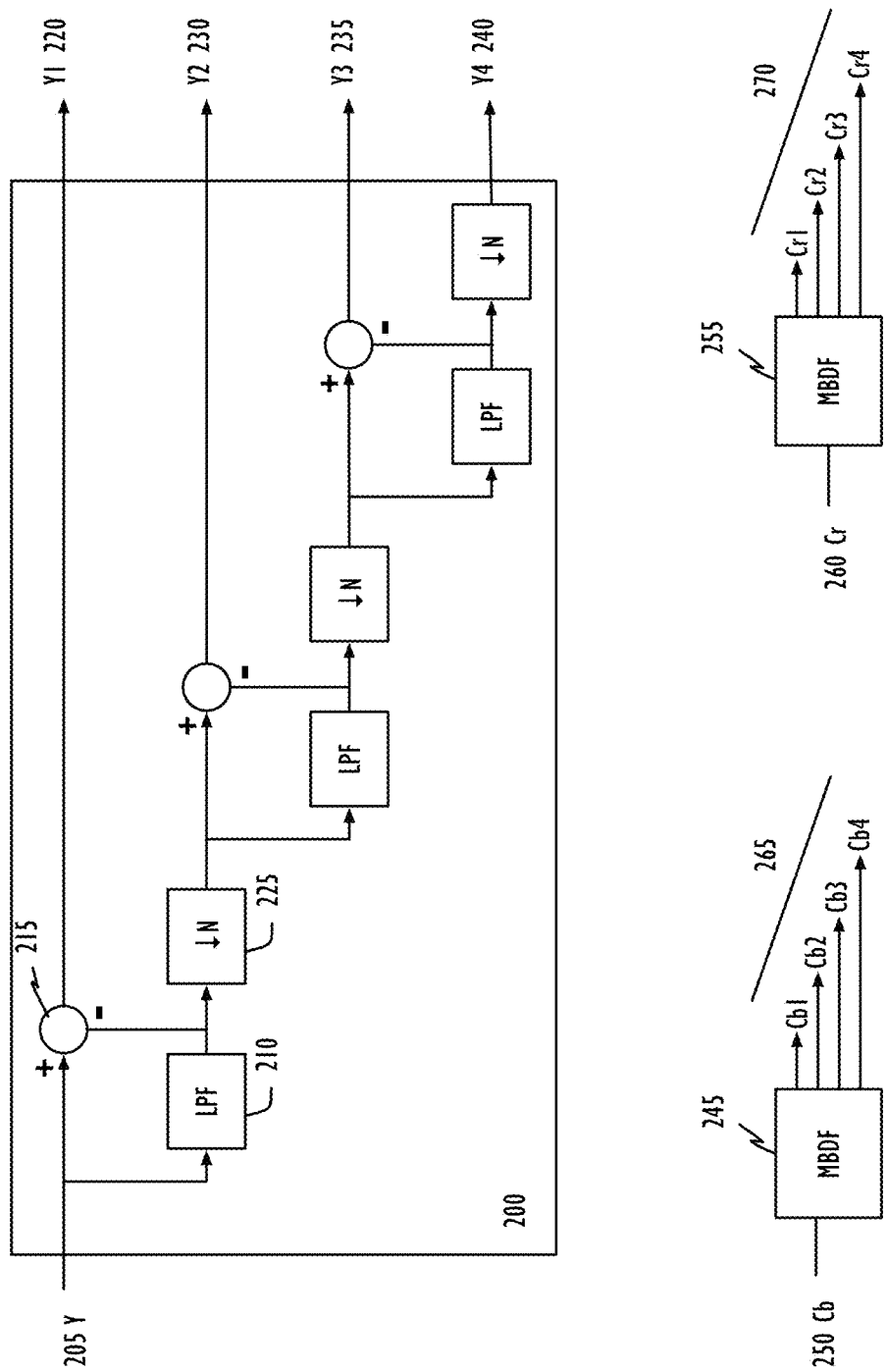
FIG. 2 shows, in block diagram form, a multi-band decomposition filter (MBDF) in accordance with one embodiment.

Referring to FIG. 2, and as described elsewhere (see above cited applications), luma channel MBDF 200 applies luma channel 205 to a first low-pass filter (LPF) 210. Output from LPF 210 may be fed back to, and subtracted from, incoming luma channel 205 by node 215 to provide first output band Y1 220. Output band Y1 220 characterizes the highest frequency components of luma channel 205. Output from LPF 210 may also be supplied to down-sampler 225. Output from down-sampler 225 provides input to a next level LPF, node, and down-sampler that operates in a manner analogous to LPF 210, node 215 and down-sampler 225 to produce output band Y2 230. Output band Y2 230 characterizes luma channel 205 sans high-frequency band Y1 220. This chain may be repeated with each band's output characterizing luma channel 205 minus all, or substantially all, of the prior bands' frequency components. For example, output band Y3 235 represents luma channel 205 substantially void of the frequency components of output bands Y1 220 and Y2 230. Similarly, output band Y4 240 represents luma channel 205 substantially void of the frequency components of output bands Y1 220, Y2 230, and Y3 235. In one embodiment, each of a MBDF BB00's low-pass filters are similar. In another embodiment, each LPF has the same or substantially the same bandwidth. In yet another embodiment, each LPF may be replaced by a high-pass filter. In some embodiments, channel data may be down-sampled by a factor of two in each direction (e.g., N=2 for down-sampler 225). Thus, an input channel that is 8 mega-pixel (MP) in size will be 2 MP in size after being down-sampled once, 0.5 MP after being down-sampled a second time, 0.125 MP after being down-sample a third time, and so forth. Multi-band decomposition filters 245 (for Cb channel 250) and 255 (for Cr channel 260) may each operate similarly to MBDF 200 so as to produce Cb bands 265 and Cr bands 270. In one embodiment, each chroma channel may be decomposed into the same number of bands as is the luma channel (e.g., via MBNF 300). In another embodiment, chroma channels may be decomposed into a different number of bands that is the luma channel.

Figure 3:
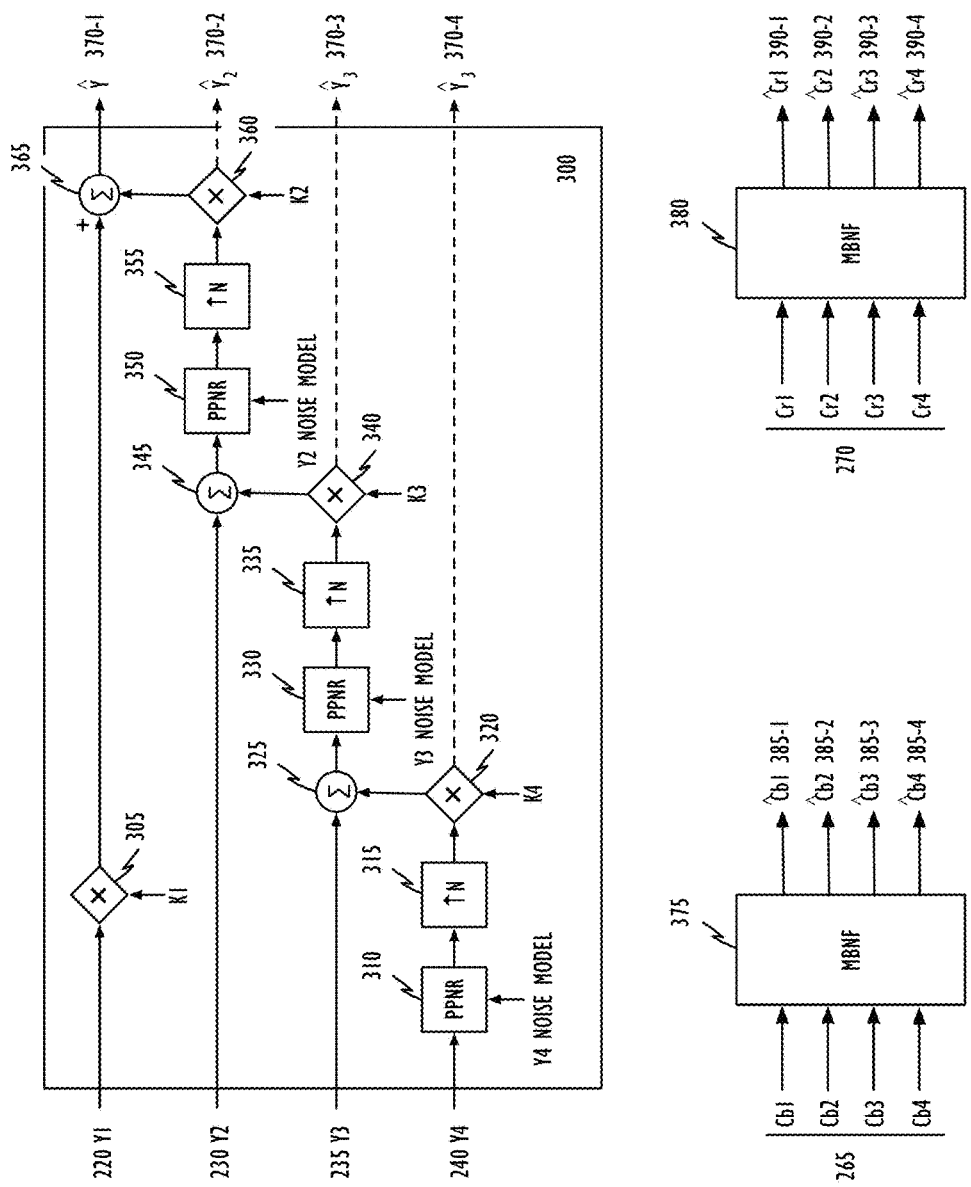
FIG. 3 shows, in block diagram form, a multi-band noise filter (MBNF) in accordance with one embodiment.

Referring to FIG. 3, also described elsewhere (see above cited applications), luma channel MBNF 300 applies the luma channel's Y1 band 220 to a first sharpening filter 305. Sharpening filter 305 may use a tuning parameter, K1, to control the amount of sharpness/fine grain amplitude desired. According to some embodiments, for bright scenes sharpening filter 305 may not provide any attenuation (e.g., K1=1.0). If more sharpness is desired, K1 could be set to a value greater than 1. For low light levels where pipeline artifacts become more visible, K1 may progressively become smaller, i.e., K1<1.0. Next, the lowest frequency band information, output band Y4 240 in the example of FIG. 2, may be filtered in accordance with per-pixel noise reduction element (PPNR) 310. As shown, PPNR filter 310 uses output band Y4's 240 particular noise model. In one embodiment, the noise model used may be of the type described in the above-identified applications. In other embodiments however, the noise model may be identified in any manner appropriate to the environment a particular image capture system is to be used in. In general, the task of denoising filters such as element 310 is to determine which pixels are similar to the pixel being de-noised. Those pixels determined to be similar may be combined in some fashion and the resulting value (e.g., average or median) substituted for the original value of the pixel being de-noised. The amount of denoising to be applied may be adjusted by the threshold used to trigger the decision of whether two pixels are similar. Little denoising is tantamount to choosing a narrow band about a value expected for the pixel being de-noised. Lots of denoising is tantamount to choosing a broad band about the value expected for the pixel being de-noised. The former combines relatively few pixels to determine a new value for the pixel being de-noised. The latter combines relatively many pixels to determine a new value for the pixel being de-noised. Stated differently, conservative de-noising refers to a similarity threshold that yields relatively few pixels that are similar; aggressive de-noising refers to a similarity threshold that yields relatively more pixels that are similar. Next, the noise reduced data from PPNR filter 310 may be up-sampled by up-sampler 315 and sharpened by sharpening filter 320. In one embodiment, the amount of up-sampling provided by element 320 mirrors the amount of down-sampling used to generate output band Y4 240 (see FIG. 2). Sharpening filter 320 may use a tuning parameter, K4, in a manner analogous to filter 305's tuning parameter. De-noised and sharpened data may be combined with the next higher frequency band via node 325, where after elements 330, 335, 340 and 345 filter, up-sample, sharpen, and combine in a manner analogous to elements 310-325. Similarly, output from combining node 345 is operated on by PPNR filter 350, up-sampled by up-sampler 355, sharpened by sharpening filter 360 (with its own tuning parameter K2), and finally combined with the output from sharpening filter 305 in node 365 to produce de-noised and sharpened luma signal Ŷ 370-1. Shown as 370-2, 370-3 and 370-4 are the individually filtered and sharpened levels $\hat{Y}_2$, $\hat{Y}_3$, and $\hat{Y}_4$ respectively. Multi-band noise filters 375 (for Cb channel output bands 265) and 380 (for Cr channel output bands 270) may each operate similarly to MBNF 300 to produce de-noised output channels Ĉb1 to Ĉb4 385 and channels Ĉr1 to Ĉr4 385-1 to 385-4 and 390-1 to 390-4 respectively. It is noted, however, that Chroma MBNFs 375 and 380 do not, in general, use sharpening filters. In the embodiment shown in FIG. 3, output band Y1 220 is not noise filtered. This need not be true in all implementations. In addition, while sharpening filter tuning parameters K1-K4 have been discussed as acting similarly they need not have the same value. Further, in other embodiments one or more of sharpening filters 305, 320, 340, and 360 may be omitted.

Above, and in the incorporated prior cited references, the development of noise models, sharpening factors and denoising strengths that may be used in MBNR operations have been disclosed. Here those earlier efforts are extended for use in image fusion operations. The approach taken here is to use mid-level features (e.g., features that share a semantic property such as edges, lines, patterns, gradients, pyramid level, and frequency band) and high-level regions (e.g., regions labeled according to a semantic criteria such as color, a moving region, and a face and/or other specified shape) to drive low-level fusion (e.g., pixel operators such as averaging).

In the multi-band approach to single image denoising described above images are split into a number of channels (each of which may be thought of as an image in its own right), with each channel further split into a number of bands. Since each band is a filtered and down-sampled version of the next higher band (see above), the collection of bands comprising a channel/image may be thought of as a pyramid. Each pyramid's top-most band reflecting an image's highest frequency components. Each pyramid's base or bottom-most band reflecting the image's lowest frequency components. The multi-band approach to fusion described herein is also pyramid-based. That is, every input image/channel is decomposed into bands (pyramids); the bands are then fused using low-level noise dependent similarity measures wherein pixel similarities may be correlated at different scales—pixels in a reference image may be compared to pixels in an input image at the same scale/band as well as at different scales/bands. (As the term "level" has more intuitive appeal than "band" when discussing image fusion operations, this term will be used in the following discussion.)

It has been found that robust similarity measures need a noise model that can adapt to varying imaging conditions (e.g., light level and illuminant). During fusion, there is the additional need to differentiate between still and moving objects or regions and to account for registration errors due to hand-shake and rolling shutter. In accordance with this disclosure, a luma pixel at location (x, y) in level "1" of one input luma image ($Y_{in}^i(x, y)$) is similar to the corresponding pixel in the reference luma image ($Y_{ref}^i(x, y)$) if:

$$|Y_{in}^i(x,y) - Y_{ref}^i(x,y)| \le Xf(\sigma_{in}^i(x,y), \sigma_{ref}^i(x,y)), \quad \text{EQ. 1}$$

where X represents a tunable denoising strength and f(·) is some function of the noise level at pixel location (x, y) in the input image $\sigma_{in}^i(x, y)$ and the reference image $\sigma_{ref}^i(x,y)$ at pyramid level "i" and as predicted by the luma channel's noise model at level i. (The process for chroma similarity in analogous.) Function f(·) could be, for example, a mean, max, or root-mean-squared function. In one embodiment, f(·) may be based solely on the input image's noise model $\sigma_{in}^i(x, y)$. In another embodiment, f(·) may be based solely on the reference image's noise model $\sigma_{ref}^i(x,y)$. In still another embodiment, f(·) may be based on both the input and reference images' noise models $\sigma_{in}^i(x, y)$ and $\sigma_{ref}^i(x, y)$.

To determine the similarity of a pixel across levels, a filtered version of the reference image ($\hat{Y}_{ref}^{i}$) may be obtained by up-sampling $Y_{ref}^{i+1}$ by N may be used (see FIGS. 2 and 3). Accordingly, a pixel at location (x, y) in one input luma image is similar to the corresponding pixel in the next level of the reference image ($Y_{ref}^{i+1}$) if:

$$|Y_{in}^{i}(x, y) - Y_{ref}^{i+1}(x, y) \uparrow N| \leq Xf(\sigma_{in}^{i}(x,y), \sigma_{ref}^{i+1}(x, y)). \quad \text{EQ. 2}$$

Note, the reference image ($Y_{ref}^{i+1}$) is actually an (N×N) patch filtered version of $Y_{ref}^{i}$—where the reference image $Y_{ref}^{i}$ is (A×B) in size and $Y_{ref}^{i+1}$ is (A/N, B/N) in size. If additional filtering is desired, the reference image may be the up-sampled by $N^2$ (in both dimensions) version of the $Y_{ref}^{i+2}$ again (assuming there is a level above the i-th level). If this is done, the reference image ($Y_{ref}^{i+2}$) would be a $N^2 \times N^2$ patch filtered version of $Y_{ref}^{i}$. As the number of levels increase, the filtered reference value becomes closer to the noise-free value, resulting in a more robust similarity measure. This, in turn, enables a more stable fusion operation with fewer artifacts. The degree of filtering can depend on the nature of the pixel. If a pixel belongs to a smooth region, the reference image may be heavily (aggressively) filtered; if the pixel is on a very strong edge, the reference image may be moderately (conservatively) filtered; and if the pixel belongs to a textured area, light or no filtering may be the better approach. It is noted here, up-sampling may be done easily. Thus, this approach represents a very unique way of estimating a dynamically filtered reference image at little or no computational impact and has properties similar to that of patch based distance measures. As previously noted, patch-based distance measures themselves are known to be computationally very expensive.

Flat, edge, and textured pixels may be distinguished by determining horizontal and vertical gradients on the luma (Y) channel. Gradient determination within a single layer may be found as follows.

$$d_x = Y^i(x+1, y) - Y^i(x, y), \text{ and} \quad \text{EQ. 3A}$$

$$d_y = Y^i(x, y+1) - Y_i(x, y) \quad \text{EQ. 3B}$$

where $d_x$ represents the horizontal or 'x' gradient, $d_y$ represents the vertical or 'y' gradient, 'x' and 'y' represent the coordinates of the pixel whose gradients are being found, and $Y^i(x, y)$ represents the luma channel value of the pixel at location (x, y) in the i-th level. In one embodiment, a degree of textureness metric may be taken as the maximum gradient: $\max(d_x, d_y)$. In other embodiments, for example, a textureness metric could be the mean($d_x, d_y$), median($d_x, d_y$), or Euclidean distance $\sqrt{d_x^2 + d_y^2}$ between the two gradient values. In practice, any measure that is appropriate for a given implementation may be used. For example, Sobel and Canny type edge detectors may also be used. This edge/texture (textureness) metric indicates if a pixel is in a smooth region or an edge/textured region of an image.

To reduce the noise sensitivity this textureness metric can exhibit, it may be determined on an up-sampled version of the next (pyramid) level as follows.

$$d_x = Y^{i+1}(x+1, y) - Y^{i+1}(x, y), \text{ and} \quad \text{EQ. 4A}$$

$$d_y = Y^{i+1}(x, y+1) - Y^{i+1}(x, y). \quad \text{EQ. 4B}$$

Since each level is a filtered and down-sampled version of the immediately higher level (e.g., compare output band Y4 240 to output band Y3 235), determining an edge/texture metric on an up-sampled version of the next higher level, the textureness metric captures only significant edges and textures. This allows fusion to be performed more aggressively on pixels from smooth regions of an image, while edges and textured regions may be fused conservatively.

Another metric that may be used to determine if a pixel belongs to a smooth region may be based on the difference between a pixel at the i-th band and a pixel in the up-sampled version of the next lower (i+1) band:

$$\Delta_{band} = Y_i(x,y) - Y_{i+1}(x,y) \uparrow N. \quad \text{EQ. 5}$$

A low $\Delta_{band}$ metric value may be indicative of the pixel belonging to a smooth region, while a large value may indicate the pixel belongs to an edge/texture. The earlier described edge strength measure coupled with the high frequency estimate of EQ. 5 can provide a very robust technique to determine whether a pixel is on/in an edge/texture region. With these extensions, smooth areas may again be de-noised more and sharpened less, while edge/texture regions may again be de-noised less and sharpened more.

Often times input images have different black levels, meaning they may have a slightly different color cast. This can be especially significant in low light where even a small error in black level can get amplified by analog and digital camera gains, white balance gains, etc. Further, in multi-exposure fusion where the difference in black levels between long-exposure and short-exposure frames could be even more pronounced, the color cast difference between input images can be even more significant. Over estimation of black level can result in a purple cast, while under estimation can result in a green cast. These color cast differences can make it difficult for input images to fuse well—especially in low light.

A novel approach to account for the black level differences between images estimates per-pixel black level compensation based on the difference between the up-sampled lower fused level and the upper input image pyramid level that is to be fused:

$$\Delta_{blk}^{i}(x,y) = Y_{in}^{i}(x,y) - Y_{ref}^{i+1}(x,y) \uparrow N, \quad \text{EQ. 6}$$

where $\Delta_{blk}^{i}(x, y)$ represents the black level compensation for a pixel at location (x, y) in the i-th level. This black level compensation factor may be incorporated into the similarity measure threshold of EQ. 1 as follows.

$$|Y_{in}^{i}(x,y) - Y_{ref}^{i}(x,y) + \Delta_{blk}^{i}(x,y)| \leq Xf(\sigma_{in}^{i}(x,y), \sigma_{ref}^{i}(x,y)). \quad \text{EQ. 7}$$

A threshold in accordance with EQ. 6 enables the fusion of images that have different black levels/color casts.

If performance is a concern, black level compensation may be estimated as a difference of the average value of the lowest pyramid level of the reference and input images:

$$\Delta_{blk} = \text{avg}(Y_{in}^{lowest}) - \text{avg}(Y_{ref}^{lowest}). \quad \text{EQ. 8}$$

This estimated value may be used in the similarity threshold of EQ. 6 as follows:

$$|Y_{in}^{i}(x,y) - Y_{ref}^{i}(x,y) + \Delta_{blk}| \leq Xf(\sigma_{in}^{i}(x,y), \sigma_{ref}^{i}(x,y)). \quad \text{EQ. 7}$$

In this embodiment, black level difference may be estimated once. Since every pyramid level is down-sampled by N (e.g., 2), the lowest pyramid level has relatively fewer pixels so this estimate can be computed efficiently.

Figure 4A:
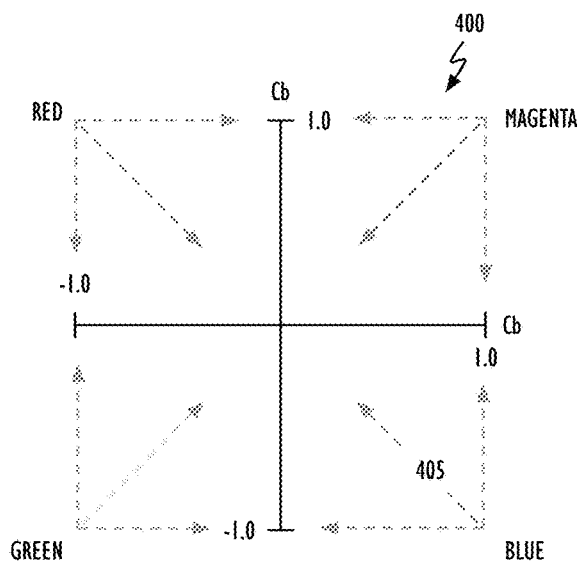
FIGS. 4A-4C illustrate CbCr chromaticity spaces in accordance with two embodiments.

One high-level semantic property that may be used to inform fusion operations is color (chroma). Referring to FIG. 4A, CbCr chromaticity diagram 400 illustrates the color shading in the CbCr chromaticity space. To mitigate against the added noise in an image's smooth blue regions such as the sky (due to a sensor's weak red channel signal in these regions), it would be beneficial to de-noise pixels that fall in blue quadrant 405 more aggressively. In one embodiment, a blue pixel may be defined as any pixel that satisfies the following constraints:

$$f(T_{Cb}) \le Cb \le 1, \text{ and} \qquad \text{EQ. 10A}$$

$$-1 \le Cr \le g(T_{Cr}), \text{ where} \qquad \text{EQ. 10B}$$

Figure 4B:
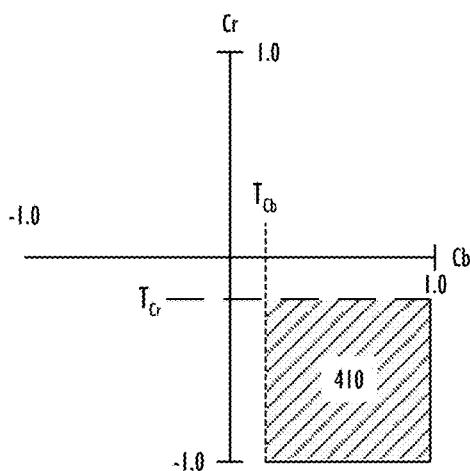
Figure 4C:
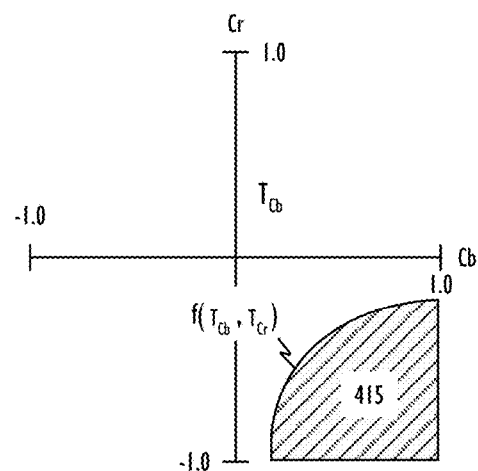

$T_{Cb}$ and $T_{Cr}$ represent Cb and Cr chromaticity thresholds respectively, f(·) represents a first threshold function, g(·) represents a second threshold function, and Cb and Cr refer to the chroma of the pixel being de-noised. Referring to FIG. 4B, one embodiment of EQ. 10 yields "blue" region 410. (f(·) and g(·) are both linear functions). Referring to FIG. 4C, in another embodiment blue region 415 may be defined by a non-linear relationship, $f(T_{Cb}, T_{Cr})$. In general, any relationship that can partition CbCr chromaticity space 400 into blue and not blue regions may be used (e.g., polynomial and piece-wise linear). By itself, it is known that modulating denoising strengths based on color constraints (e.g., as represented by EQ. 9 and illustrated in FIGS. 4B and 4C) has significant negative side-effects (it may cause over-smoothing of blue objects such as shirts, jeans, water texture, etc.). It has been unexpectedly determined, however, that coupling edge/texture constraints with color constraints as described herein help mitigate noise in smooth blue regions such as blue sky without affecting edges/texture in other blue objects.

Another high-level semantic property that may be used to inform fusion operations is motion. In one embodiment, motion may be accounted for using a scene stability map of how well images were fused. Pixels that fused well may be considered stable, while pixels that did not fuse well may be taken to indicate relative motion between input images. Using scene stability as a driver, a second de-noising pass in which pixels that did not fuse well originally may be de-noised more heavily. In this manner it is possible to obtain a smooth and pleasing transition between static and moving portions of the images being fused. This is especially important when fusing static regions from long exposure images and moving portions from short exposure images. Here the exposure difference between short and long images can be quite significant. If scene stability is not used to drive a second de-noising pass, there can be objectionable transitions between static and moving portions of the images being fused. (Yet another high-level semantic property that may be treated similarly is, for example, a face—a region identified as having a face—or some other definable region.)

Figure 5A:
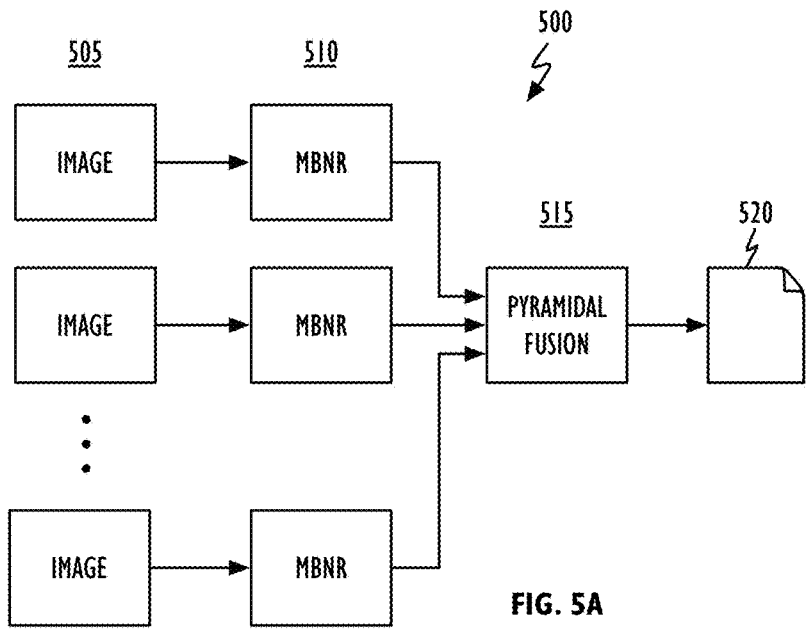
FIGS. 5A-5B illustrate various fusion operations in accordance with this disclosure.
Figure 5B:
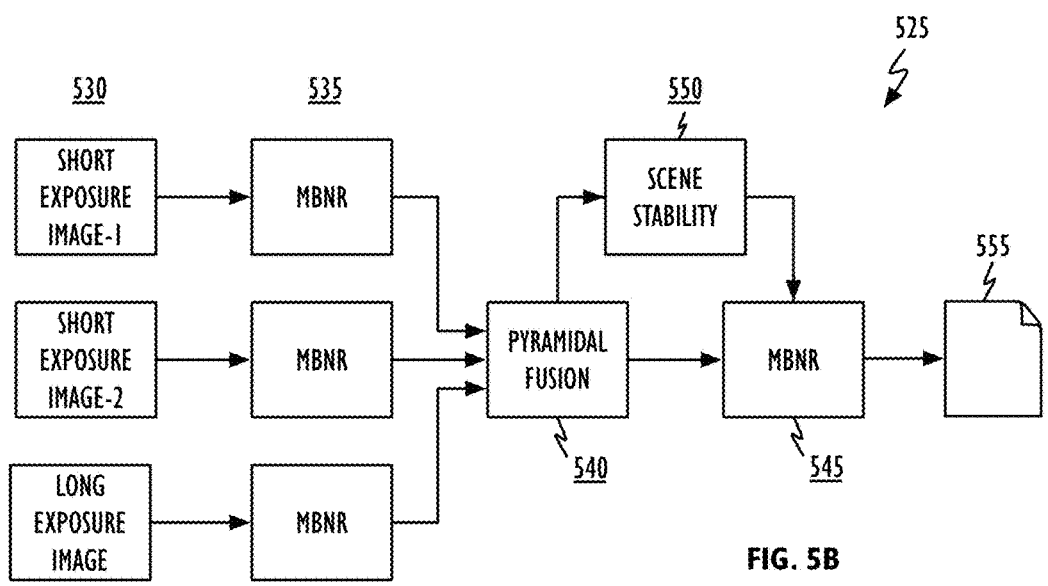

Referring to FIG. 5A, multi-image fusion operation 500 is illustrated in which multiple images, each having the same exposure 505, may be de-noised 510 and fused 515 to generated output fused image 520 in accordance with this disclosure. As shown, fusion may be performed in a single step. Referring to FIG. 5B, mixed exposure fusion operation 525 is illustrated in which short- and long-exposure images 530 are de-noised 535, fused 540 and de-noised a second time 545 modulated by scene stability 550 to generate output image 555. Second MBNR pass 545 may be performed to provide smoother transitions between static and moving regions in output image 555.

Figure 6A:
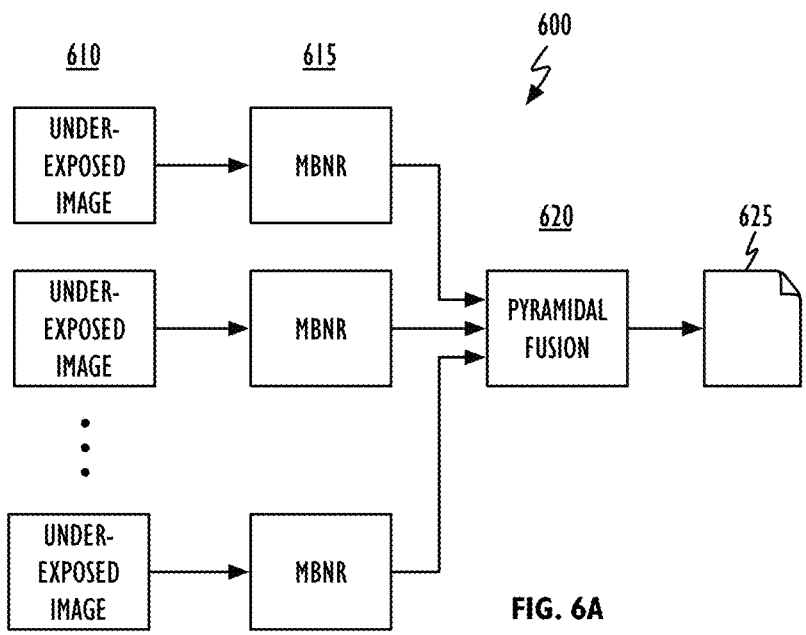
FIGS. 6A-6B illustrate two high dynamic range fusion operations in accordance with this disclosure.
Figure 6B:
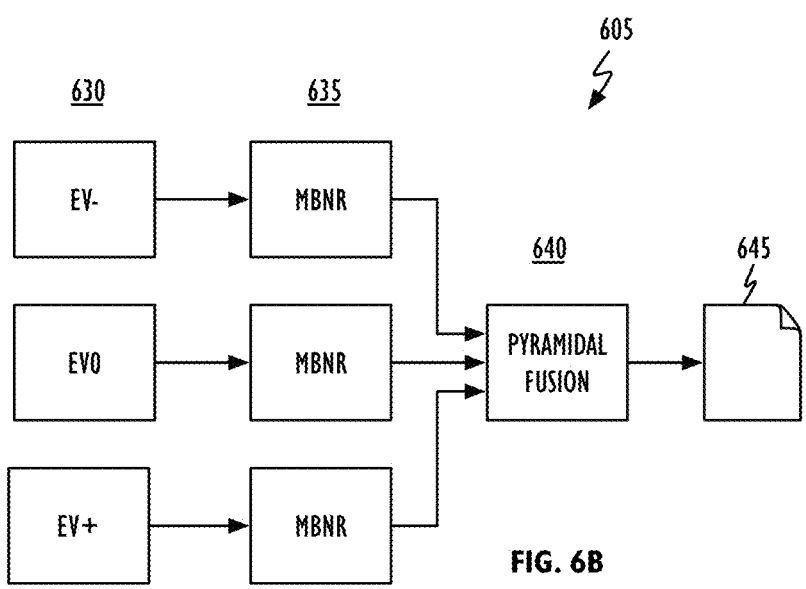

Referring to FIGS. 6A and 6B, two approaches (600 and 605) in accordance with this disclosure to provide high dynamic range (HDR) fusion are illustrated. In FIG. 6A, multiple under-exposed images 610 may be de-noised 615 and then fused 620 to provide an HDR output image 625. In FIG. 6B, under-exposed (ev−), over-exposed (ev+), and properly exposed (ev0) images 630 may be de-noised 635 and fused 640 in accordance with this disclosure to provide an HDR output image 645.

Figure 7:
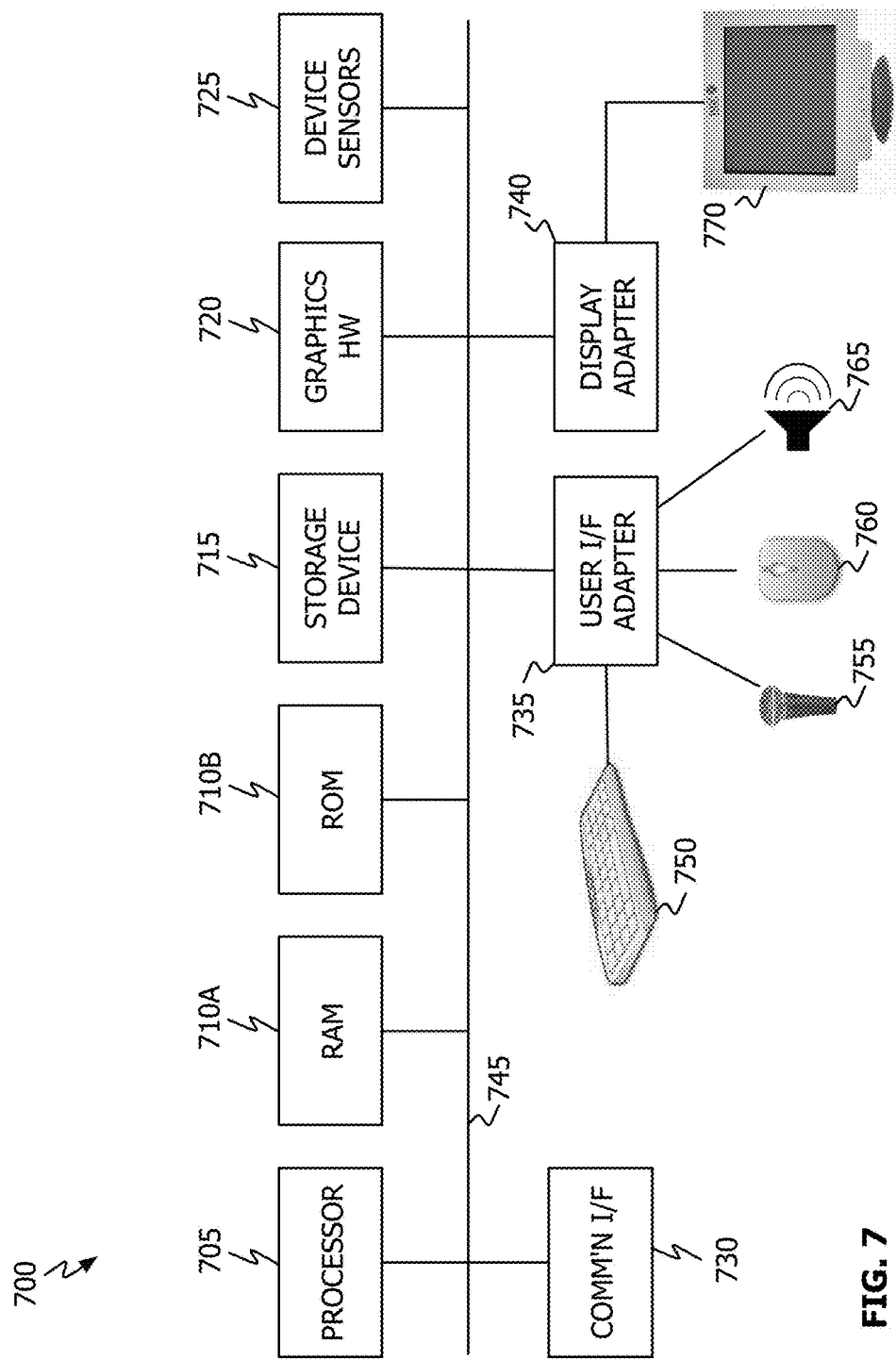
FIG. 7 shows, in block diagram form, a computer system in accordance with one embodiment.

Referring to FIG. 7, the disclosed multi-band noise reduction operations in accordance with this disclosure may be performed by representative computer system 700 (e.g., a general purpose computer system such as a desktop, laptop, notebook or tablet computer system). Computer system 700 may include one or more processors 705, memory 710 (710A and 710B), one or more storage devices 715, graphics hardware 720, device sensors 725 (e.g., 3D depth sensor, proximity sensor, ambient light sensor, accelerometer and/or gyroscope), image capture module 730, communication interface 735, user interface adapter 740 and display adapter 745—all of which may be coupled via system bus or backplane 750 which may be comprised of one or more continuous (as shown) or discontinuous communication links. Memory 710 may include one or more different types of media (typically solid-state) used by processor 705 and graphics hardware 720. For example, memory 710 may include memory cache, read-only memory (ROM), and/or random access memory (RAM). Storage 715 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 710 and storage 715 may be used to retain media (e.g., audio, image and video files), preference information, device profile information, computer program instructions or code organized into one or more modules and written in any desired computer programming language, and any other suitable data. When executed by processor(s) 705 and/or graphics hardware 720 such computer program code may implement one or more of the methods described herein. Image capture module 730 may include one or more image sensors, one or more lens assemblies and any memory, mechanical actuators (e.g., to effect lens movement), and processing elements (e.g., ISP 110) used to capture images. Image capture module 730 may also provide information to processors 705 and/or graphics hardware 720. Communication interface 735 may be used to connect computer system 700 to one or more networks. Illustrative networks include, but are not limited to, a local network such as a USB network, an organization's local area network, and a wide area network such as the Internet. Communication interface 735 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 735 may be used to connect keyboard 750, microphone 755, pointer device 760, speaker 765 and other user interface devices such as a touch-pad and/or a touch screen and a separate image capture element (not shown). Display adapter 740 may be used to connect one or more display units 770 which may provide touch input capability. Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable GPUs and each such unit may include one or more processing cores.

Figure 8:
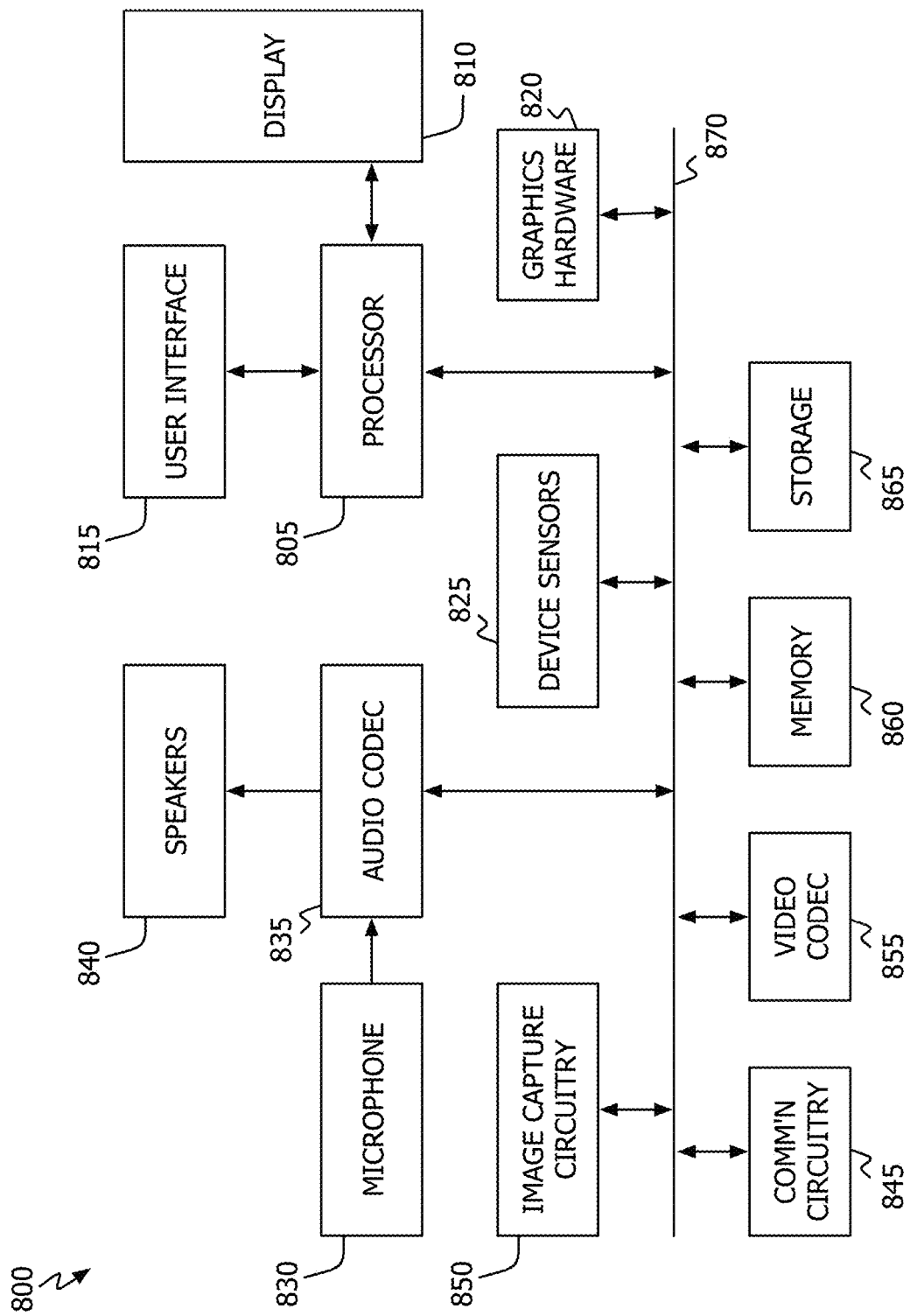
FIG. 8 shows, in block diagram form, a multi-function electronic device in accordance with one embodiment.

Referring to FIG. 8, a simplified functional block diagram of illustrative mobile electronic device 800 is shown according to one embodiment. Electronic device 800 could be, for example, a mobile telephone, personal media device, a notebook computer system, or a tablet computer system. As shown, electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, image capture circuit or unit 850, video codec(s) 855, memory 860, storage 865, and communications bus 870. Processor 805, display 810, user interface 815, graphics hardware 820, device sensors 825, communications circuitry 845, memory 860 and storage 865 may be of the same or similar type and serve the same or similar function as the similarly named component described above with respect to FIG. 7. Audio signals obtained via microphone 830 may be, at least partially, processed by audio codec(s) 835. Data so captured may be stored in memory 860 and/or storage 865 and/or output through speakers 840. Image capture circuitry 850 may capture still and video images. Output from image capture circuitry 850 may be processed, at least in part, by video codec(s) 855 and/or processor 805 and/or graphics hardware 820, and/or stored in memory 860 and/or storage 865. In one embodiment, graphics hardware 820 may include or incorporate image pipeline 100. In another embodiment, image capture circuitry 850 may include or incorporate image pipeline 100. In still another embodiment, MBNR 155 may be included or incorporated within either graphics hardware 820 or image capture circuitry 850. In yet another embodiment, all or parts of the functions described with respect to MBNR 155 may be implemented in software and be executed by processor 850. In another embodiment, some of the functionality attributed to MBNR 155 may be implemented in hardware/firmware executed, for example, by image capture circuitry 850, and some of the functionality may be implemented in software executed, for example, by processor 805.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, in one embodiment, fusion operations in accordance with FIGS. 5 and 6 may be performed on YCbCr images. In another embodiment, low-level similarity measures (e.g., EQS 1 and 2) may be used to the exclusion of mid-level adjustments (e.g., EQS. 3 and 4 and/or 5 and 6 and/or 7 and 8) may use a progressively filtered reference image to reduce artifacts. In yet another embodiment, low- and/or mid-level similarity measures may be used to the exclusion of high-level semantic elements (e.g., color faces, edges). In light of these options, and others described above, the scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A multi-band image fusion method, comprising:
   receiving three or more images, wherein each image includes a plurality of channel types, and wherein each image has at least one channel of each of the plurality of channel types;
   selecting one of the three or more images to serve as a reference image, wherein each of the other images not selected as the reference image is selected to serve as an input image;
   registering each of the input images to the reference image;
   applying multi-band noise reduction to the reference image to generate a filtered pyramidal representation of each of the reference image's channels, wherein the pyramidal representation of each of the reference image's channels comprises a plurality of levels;
   applying multi-band noise reduction to each input image to generate a filtered pyramidal representation of each channel of each input image, wherein the pyramidal representation of each channel of each input image comprises a plurality of levels;
   fusing, on a level-by-level basis, each of the reference image's filtered pyramidal representations with a corresponding filtered pyramidal representation of each input image to generate a fused image channel for each channel of the reference image; and
   saving the fused image channels to a memory.

2. The method of claim 1, wherein each of the input images has a different exposure.

3. The method of claim 1, wherein fusing further comprises:
   determining a first metric indicative of a quality of fusion of a first fused image channel; and
   applying a second multi-band noise reduction to the first fused image channel based on the first metric.

4. The method of claim 1, wherein fusing is based on a similarity metric that compares a pixel at a given level of a reference image's pyramidal representation with a corresponding pixel at each level of an input image's corresponding pyramidal representation.

5. The method of claim 1, wherein fusing is based on a similarity metric, and wherein the similarity metric is based on a gradient between a reference image pixel at a first level of a first one of the reference image's pyramidal representations and a corresponding input image pixel at each level of a first input image's corresponding pyramidal representation.

6. The method of claim 1, wherein fusing is based on a similarity metric, and wherein the similarity metric is based on a high frequency estimate between a reference image pixel at a first level of a first one of the reference image's pyramidal representations and a corresponding input image pixel at a different level of a first input image's corresponding pyramidal representation.

7. The method of claim 1, wherein fusing is based on a similarity measure that accounts for a black level difference between the reference image and at least one input image.

8. The method of claim 7, wherein the black level difference comprises an estimated value.

9. The method of claim 1, wherein fusing is based on a similarity measure that accounts for smooth blue regions of the reference image and an input image.

10. A non-transitory program storage device comprising instructions stored thereon to cause one or more processors to:

receive three or more images, wherein each image includes a plurality of channel types, and wherein each image has at least one channel of each of the plurality of channel types;

select one of the three or more images to serve as a reference image, wherein each of the other images not selected as the reference image is selected to serve as an input image;

register each of the input images to the reference image;

apply multi-band noise reduction to the reference image to generate a filtered pyramidal representation of each of the reference image's channels, wherein the pyramidal representation of each of the reference image's channels comprises a plurality of levels;

apply multi-band noise reduction to each input image to generate a filtered pyramidal representation of each channel of each input image, wherein the pyramidal representation of each channel of each input image comprises a plurality of levels;

fuse, on a level-by-level basis, each of the reference image's filtered pyramidal representations with a corresponding filtered pyramidal representation of each input image to generate a fused image channel for each channel of the reference image; and save the fused image channels to a memory.

11. The non-transitory program storage device of claim 10, wherein at least one of the three or more images is under-exposed and at least one of the three or more images is over-exposed.

12. The non-transitory program storage device of claim 10, wherein the instructions to fuse further comprise instructions to cause the one or more processors to:

determine a first metric indicative of a quality of fusion of a first fused image channel; and apply a second multi-band noise reduction to the first fused image channel based on the first metric.

13. The non-transitory program storage device of claim 10, wherein the instructions to fuse are based on a similarity metric that compares a pixel at a given level of a reference image's pyramidal representation with a corresponding pixel at each level of an input image's corresponding pyramidal representation.

14. The non-transitory program storage device of claim 10, wherein the instructions to fuse are based on a similarity metric, and wherein the similarity metric is based on a gradient between a reference image pixel at a first level of a first one of the reference image's pyramidal representations and a corresponding input image pixel at each level of a first input image's corresponding pyramidal representation.

15. The non-transitory program storage device of claim 10, wherein the instructions to fuse are based on a similarity metric, and wherein the similarity metric is based on a high frequency estimate between a reference image pixel at a first level of a first one of the reference image's pyramidal representations and a corresponding input image pixel at a different level of a first input image's corresponding pyramidal representation.

16. The non-transitory program storage device of claim 10, wherein the instructions to fuse are based on a similarity measure that accounts for a black level difference between the reference image and at least one input image.

17. The non-transitory program storage device of claim 16, wherein the black level difference comprises an estimated value.

18. An image capture device, comprising:
an image sensor;
a memory electrically coupled to the image sensor;
a display operatively coupled to the memory; and
one or more processors operatively coupled to the image sensor, the memory, and the display, wherein the one or more processors are configured to execute instructions stored in the memory to cause the image capture device to— capture three or more images in sequence by the image sensor, wherein each image includes a plurality of channel types, and wherein each image has at least one channel of each of the plurality of channel types, select one of the three or more images to serve as a reference image, wherein each of the other images not selected as the reference image is selected to serve as an input image, register each of the input images to the reference image, apply multi-band noise reduction to the reference image to generate a filtered pyramidal representation of each of the reference image's channels, wherein the pyramidal representation of each of the reference image's channels comprises a plurality of levels, apply multi-band noise reduction to each input image to generate a filtered pyramidal representation of each channel of each input image, wherein the pyramidal representation of each channel of each input image comprises a plurality of levels, fuse, on a level-by-level basis, each of the reference image's filtered pyramidal representations with a corresponding filtered pyramidal representation of each input image to generate a fused image channel for each channel of the reference image, and save the fused image channels to the memory.

19. The image capture device of claim 18, wherein at least one of the three or more images is under-exposed and at least one of the three or more images is over-exposed.

20. The image capture device 18, wherein the instructions to fuse further comprise instructions to cause the one or more processors to:

determine a first metric indicative of a quality of fusion of a first fused image channel; and apply a second multi-band noise reduction to the first fused image channel based on the first metric.

21. The image capture device of claim 18, wherein the instructions to fuse are based on a similarity metric that compares a pixel at a given level of a reference image's pyramidal representation with a corresponding pixel at each level of an input image's corresponding pyramidal representation.

22. The image capture device of claim 18, wherein the instructions to fuse are based on a similarity metric, and wherein the similarity metric is based on a gradient between a reference image pixel at a first level of a first one of the reference image's pyramidal representations and a corresponding input image pixel at each level of a first input image's corresponding pyramidal representation.

23. The image capture device of claim 18, wherein the instructions to fuse are based on a similarity metric, and wherein the similarity metric is based on a high frequency estimate between a reference image pixel at a first level of a first one of the reference image's pyramidal representations and a corresponding input image pixel at a different level of a first input image's corresponding pyramidal representation.

24. The image capture device of claim 18, wherein the instructions to fuse are based on a similarity measure that accounts for a black level difference between the reference image and at least one input image.

25. The image capture device of claim 24, wherein the black level difference comprises an estimated value.

* * * * *